United States Patent
Kim

(10) Patent No.: US 9,389,307 B2
(45) Date of Patent: Jul. 12, 2016

(54) PANORAMIC SCAN RADAR AND PANORAMIC LASER SCANNING METHOD

(71) Applicant: Hanwha Techwin Co., Ltd., Changwon-si (KR)

(72) Inventor: Jae Hyung Kim, Changwon (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 399 days.

(21) Appl. No.: 14/140,645

(22) Filed: Dec. 26, 2013

(65) Prior Publication Data

US 2014/0198308 A1 Jul. 17, 2014

(30) Foreign Application Priority Data

Jan. 11, 2013 (KR) .................. 10-2013-0003505

(51) Int. Cl.
*G01C 3/08* (2006.01)
*G01S 7/481* (2006.01)
*G01S 17/02* (2006.01)

(52) U.S. Cl.
CPC .............. *G01S 7/4817* (2013.01); *G01S 17/02* (2013.01)

(58) Field of Classification Search
CPC .............................. G01S 7/4817; G01S 17/02
USPC ....................................................... 356/4.01
See application file for complete search history.

(56) References Cited

U.S. PATENT DOCUMENTS

| 5,337,189 | A | * | 8/1994 | Krawczyk | G01S 7/4812 356/28.5 |
|---|---|---|---|---|---|
| 5,805,275 | A | * | 9/1998 | Taylor | G01S 7/4811 180/167 |
| 7,411,661 | B2 | | 8/2008 | Kim | |
| 7,580,117 | B2 | * | 8/2009 | Okada | G01S 7/4812 356/4.01 |
| 7,978,315 | B2 | | 7/2011 | Lee | |
| 2007/0194977 | A1 | | 8/2007 | Goutoule et al. | |
| 2010/0053595 | A1 | | 3/2010 | Lee | |
| 2010/0149407 | A1 | * | 6/2010 | Lee | G01S 7/4802 348/348 |

FOREIGN PATENT DOCUMENTS

| JP | 2789741 B2 | 6/1998 |
|---|---|---|
| JP | 2009-069003 A | 4/2009 |
| KR | 10-2008-0005639 A | 1/2008 |
| KR | 10-2009-0011399 A | 2/2009 |
| KR | 10-2009-0015546 A | 2/2009 |
| KR | 10-2009-0036755 A | 4/2009 |
| KR | 10-2010-0026284 A | 3/2010 |
| KR | 10-2010-0136163 A | 12/2010 |
| KR | 10-2012-0043843 A | 5/2012 |

* cited by examiner

*Primary Examiner* — Mark Hellner
(74) *Attorney, Agent, or Firm* — Sughrue Mion, PLLC

(57) ABSTRACT

A panoramic scan radar is provided. The panoramic scan radar includes: a fixed base; a rotary base which is rotatably combined with the fixed base; a reflector which is disposed on the rotary base to rotate with the rotary base and includes a reflective surface; a laser emitter which is disposed on the rotary base to rotate with the rotary base and selectively irradiate laser beams onto a plurality of points on the reflective surface of the reflector; and a laser receiver. The reflector reflects the laser beams toward an object and reflects at least one of the laser beams reflected by the object toward the laser receiver and the laser receiver senses the at least one of the laser beams reflected toward the laser receiver.

22 Claims, 10 Drawing Sheets

PANORAMIC SCAN RADAR AND PANORAMIC LASER SCANNING METHOD

CROSS-REFERENCE TO RELATED PATENT APPLICATION(S)

This application claims the benefit of Korean Patent Application No. 10-2013-0003505, filed on Jan. 11, 2013, in the Korean Intellectual Property Office, the disclosure of which is incorporated herein in its entirety by reference.

BACKGROUND

1. Field

Apparatuses and methods consistent with exemplary embodiments relate to a panoramic scan radar using a laser and a panoramic laser scanning method.

2. Description of the Related Art

A laser radar is used to sense surrounding topography information or objects from a car or a mobile robot. The laser radar irradiates a laser beam onto a surrounding area and uses the laser beam reflected from a surrounding object or topography to scan the surrounding object or topography.

In the related art, an example of a laser radar includes a panoramic scan radar that rotates at 360° to scan in all directions. The panoramic scan radar performs scanning in up and down directions while simultaneously rotating 360°. Irradiation angles of up and down directions of a laser are changed to perform laser scanning in up and down directions. As a method of realizing this, a method of periodically tilting an irradiation direction of a laser being emitted or a method of reflecting a laser beam off of a mirror and periodically tilting an angle of the mirror is used.

However, if an irradiation angle of a laser is tilted in up and down directions while simultaneously rotating the laser, the structure of the panoramic scan radar is complicated and unstable due to vibrations of a car. Also, to enable the laser emitter to rotate and have a long operating life, a high-priced slip ring including a large number of rotation terminals is required.

SUMMARY

Exemplary embodiments address at least the above problems and/or disadvantages and other disadvantages not described above. Also, exemplary embodiments are not required to overcome the disadvantages described above, and an exemplary embodiment may not overcome any of the problems described above.

One or more exemplary embodiments provide a panoramic scan radar that has a simple mechanical apparatus, stably operates even when a car, on which the panoramic scan radar is mounted, vibrates, and minimizes the number of terminals of a slip ring and a panoramic laser scanning method using the same.

According to an aspect of an exemplary embodiment, there is provided a panoramic scan radar including: a fixed base; a rotary base which is rotatably combined with the fixed base; a reflector which is disposed on the rotary base to rotate with the rotary base and includes a reflective surface; a laser emitter which is disposed on the rotary base to rotate with the rotary base and configured selectively irradiate laser beams onto a plurality of points on the reflective surface of the reflector; and a laser receiver, wherein the reflector is configured to reflect the laser beams toward an object and reflect at least one of the laser beams reflected by the object toward the laser receiver, and wherein the laser receiver is configured to sense the at least one of the laser beams reflected toward the laser receiver.

The reflective surface of the reflector may be formed as a curved surface.

The laser emitter may be disposed in a direction intersecting with a rotation center line of the reflector to linearly move back and forth and include a laser emitter driver configured to forcibly linearly move the laser emitter back and forth.

The laser receiver may be disposed on the fixed base and include: a slip ring that is fixed on the fixed base and a rotation terminal that is rotatably disposed on the fixed base. The laser emitter driver may be electrically connected to the rotation terminal of the slip ring.

The laser receiver may be configured to linearly move back and forth with the laser emitter in a direction intersecting with the rotation center line of the reflector.

The laser emitter may be configured to periodically change irradiation angles of laser beams to selectively irradiate laser beams onto the plurality of points on the reflective surface of the reflector.

A rotary transformer may be disposed between the fixed base and the rotary base and configured to wirelessly transmit power.

The panoramic scan radar may further include: a first wireless communicator which is disposed on the rotary base to rotate with the rotary base; and a second wireless communicator which is disposed on the fixed base to and configured to wirelessly transmit a signal to or receive a signal from the first wireless communicator.

The panoramic scan radar may further include: a light transmitter which is disposed on one of the rotary base and the fixed base; and a light receiver which is disposed on the other one of the rotary base and the fixed base. The light receiver may be configured to receive a light signal from the light transmitter, and convert the light signal into an electrical signal.

The panoramic scan radar may further include: a rotary transformer which is disposed between the fixed base and the rotary base and configured to transmit power according to a non-contact method; a first wireless communicator which is disposed on the rotary based to rotate with the rotary base; and a second wireless communicator which is disposed on the fixed base and configured to wirelessly transmit a signal to or receive a signal from the first wireless communicator.

The panoramic scan radar may further include: a rotary transformer which is disposed between the fixed base and the rotary base and configured to transmit power according to a non-contact method; a light transmitter which is disposed on one of the rotary base and the fixed base; and a light receiver which is disposed on the other one of the rotary base and the fixed base. The light receiver may be configured to receive a light signal from the light transmitter, and convert the light signal into an electrical signal.

According to an aspect of another exemplary embodiment, there is provided a panoramic laser scanning method including: rotating a reflective surface and a laser emitter together; selectively irradiating a laser beam from the laser emitter onto a plurality of points on the reflective surface; reflecting the laser beam from the reflective surface to emit the laser beam away from the laser emitter; receiving the emitted laser beam reflected from an object toward the reflective surface; and sensing the received laser beam.

The reflective surface may be formed as a curved surface.

A laser emitter may linearly move back and forth when emitting the laser beam in order to irradiate the laser beam onto the plurality of points on the reflective surface.

The returning laser beam may be sensed by a laser receiver that linearly moves back and forth together with the laser emitter.

The laser beam may be emitted while changing an irradiation angle of the laser emitter in order to irradiate the laser beam onto the plurality of points on the reflective surface.

The panoramic laser scanning method may further include: supplying power to the laser emitter according to a non-contact method by using a rotary transformer.

The panoramic laser scanning method may further include: transmitting a control signal of the laser emitter by using wireless communication.

The panoramic laser scanning method may further include: transmitting a control signal of the laser emitter according to a non-contact method by using light communication.

According to an aspect of another exemplary embodiment, there is provided a panoramic scan radar apparatus including: a fixed base; a rotary base rotatably connected to the fixed base and configured to rotate around a vertical axis; a reflector disposed on the rotary base and including a reflective surface; and a laser emitter disposed on the rotary base and configured to move in a perpendicular direction with respect to the vertical axis and emit a laser beam in a vertical direction toward the reflective surface.

The panoramic scan radar apparatus may further include a laser receiver. The reflector may be configured to reflect the laser beam away from the laser receiver toward a second reflector. The reflector may further be configured to reflect the laser beam reflected by the second reflector toward the laser receiver. The laser receiver may be configured to sense the laser beam reflected toward the laser receiver.

The reflective surface of the reflector may be formed as a curved surface.

BRIEF DESCRIPTION OF THE DRAWINGS

The above and other features and advantages will become more apparent by describing in detail exemplary embodiments with reference to the attached drawings in which.

DETAILED DESCRIPTION OF EXEMPLARY EMBODIMENTS

Figure 1:
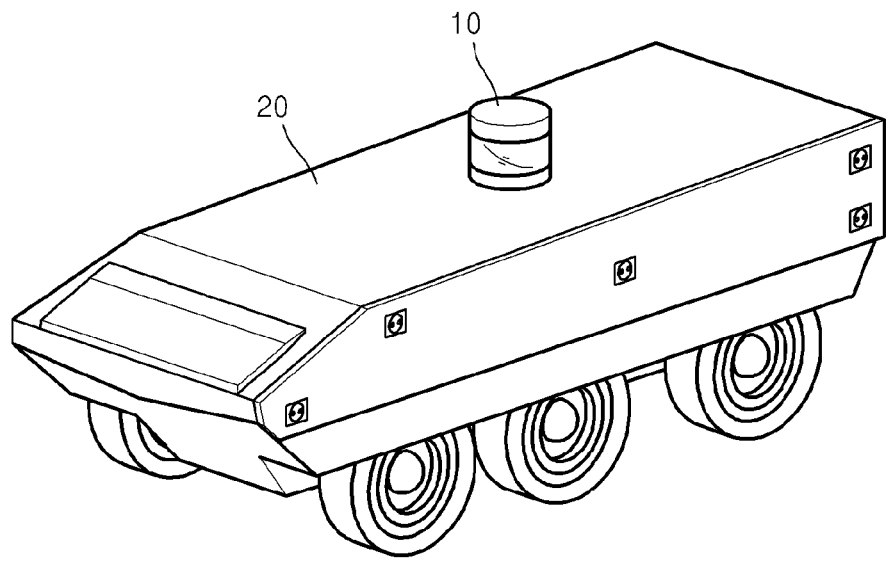
FIG. 1 is a schematic perspective view illustrating a car including a panoramic scan radar according to an exemplary embodiment.

Certain exemplary embodiments will now be described in detail with reference to the attached drawings.

In the following description, like drawing reference numerals are used for the same elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure exemplary embodiments with unnecessary detail.

FIG. 1 is a schematic perspective view illustrating a car 20 including a panoramic scan radar 10 according to an exemplary embodiment. As shown in FIG. 1, the panoramic scan radar 10 according to the present exemplary embodiment is installed in the car 20 to collect topography information or information about an object around the car 20. The panoramic scan radar 10 may be installed in a ship, a helicopter, a mobile robot, or the like.

Figure 2:
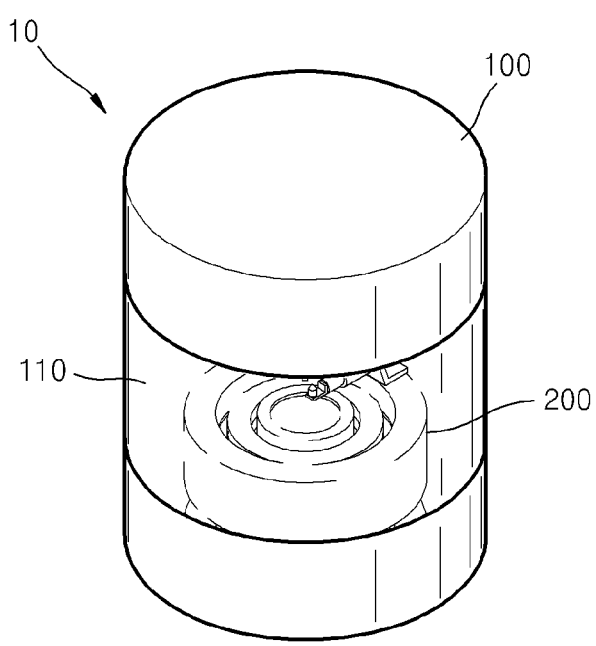
FIG. 2 is a schematic perspective view illustrating a panoramic scan radar according to another exemplary embodiment.

FIG. 2 is a schematic view illustrating the panoramic scan radar 10, according to an exemplary embodiment.

Referring to FIG. 2, the panoramic scan radar 10 according to the present exemplary embodiment includes a case 100 and a laser transceiver module 200 that is disposed inside the case 100.

The case 100 covers the laser transceiver module 200 to protect the laser transceiver module 200 from an external shock or foreign substances. The case 100 includes a light-transmitting window 110 through which a laser beam may be emitted from the laser transceiver module 200 to the outside and a laser beam reflected from the outside may also pass through to be incident onto the laser transceiver module 200. The light-transmitting window 110 may be formed in a form continuing in a circumferential direction of the case 100.

The laser transceiver module 200 is disposed inside the case 100, and emits and receives a laser beam to continuously measure a distance from a surrounding object.

Figure 3:
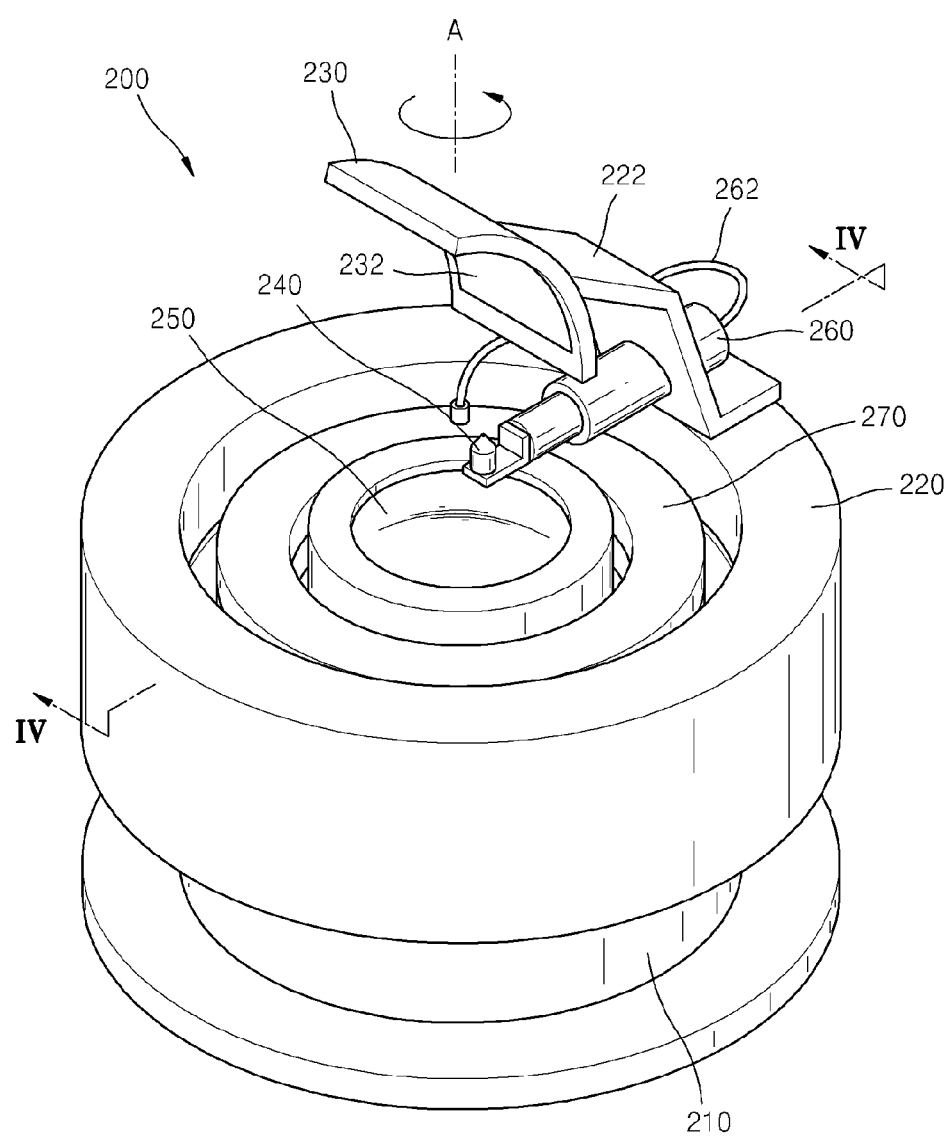
FIG. 3 is a schematic view illustrating a laser transceiver module.
Figure 4:
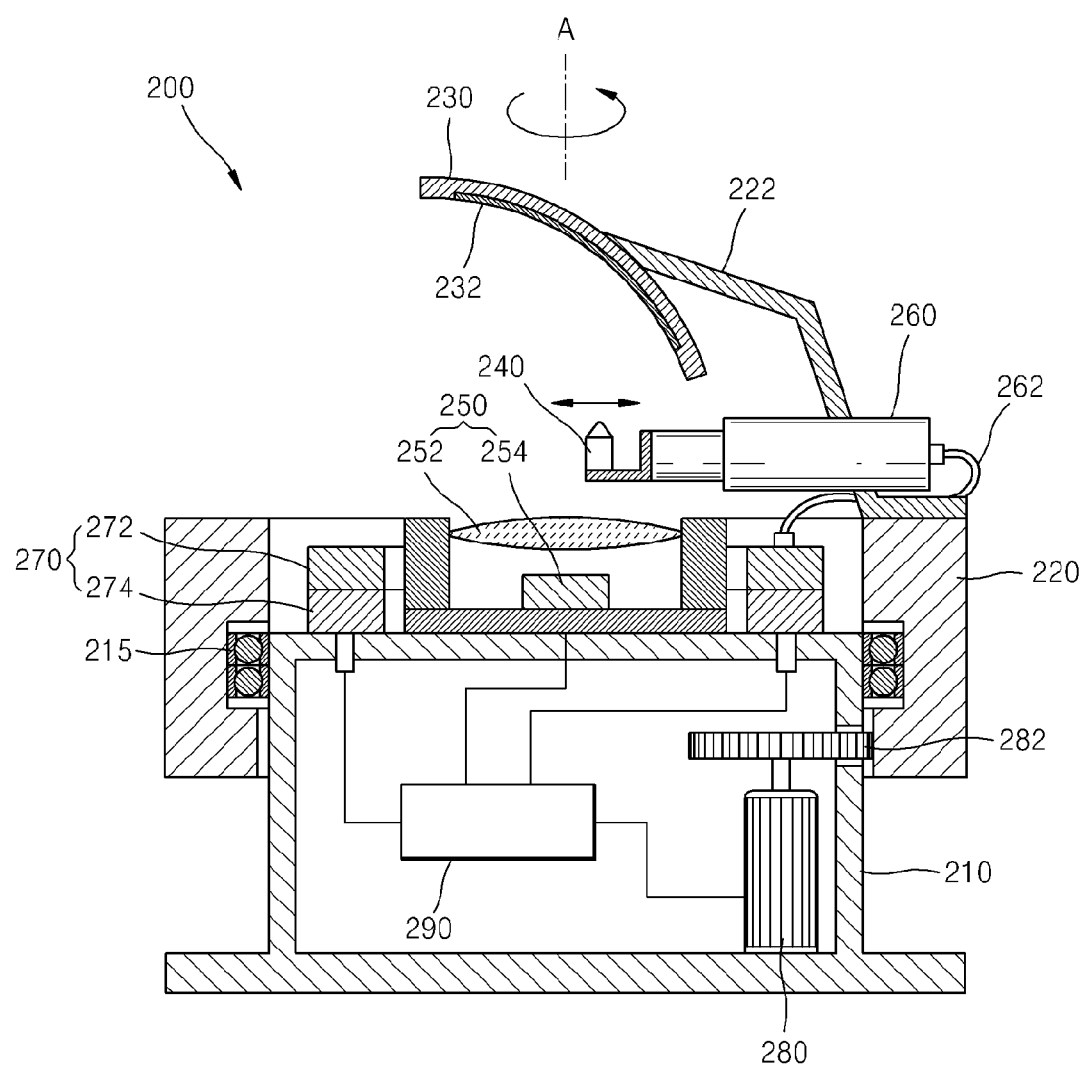
FIG. 4 is a cross-sectional view taken along line IV-IV of FIG. 3.

FIG. 3 is a schematic view illustrating the laser transceiver module 200. FIG. 4 is a schematic cross-sectional view of the laser transceiver module 200 of FIG. 3 taken along line IV-IV.

Referring to FIGS. 3 and 4, the laser transceiver module 200 includes a fixed base 210, a rotary base 220, a reflector 230, a laser emitter 240, a laser emitter driver 260, a laser receiver 250, a slip ring 270, a rotation driver 280, and a controller 290.

The fixed base 210 is fixedly disposed in the car 20 in which the panoramic scan radar 10 is installed.

The rotary base 220 is disposed on the fixed base 210 to rotate in a rotation direction. In other words, the rotary base 220 is combined with the fixed base 210 to rotate on a rotation center axis A of a vertical direction. A bearing 215 may be disposed between the rotary base 220 and the fixed base 210 so that the rotary base 220 may smoothly rotate with respect to the fixed base 210.

The reflector 230 is combined with a reflector support 222 fixedly combined with the rotary base 220 to rotate along with the rotary base 220. A reflective surface 232 is disposed on a side of the reflector 230 to reflect a laser beam emitted from the laser emitter 240. The reflective surface 232 of the reflector 230 is formed in a curved surface shape bent in one direction to operate as a concave mirror.

The laser emitter 240 is combined with the laser emitter driver 260 combined with the rotary base 220 to rotate along with a rotation of the rotary base 220. The laser emitter 240 emits a laser beam toward the reflective surface 232 of the reflector 230. The emitted laser beam is reflected from the reflective surface 232 and then emitted to the outside through the light-transmitting window 110 of the case 100. The laser emitter itself 240 may generate laser beams or may be connected to an additional laser generation module (not shown) through an optical fiber to receive laser beams to emit. If the additional laser generation module is connected to the laser emitter 240, the laser generation module may be installed at the rotary base 220 to rotate along with the laser emitter 240.

The laser emitter driver 260 is combined with the rotary base 220, and the laser emitter 240 is disposed on a side of the laser emitter driver 260. The laser emitter driver 260 may include a linear motor, for example, a voice coil motor, to change a position of the laser emitter 240. When the laser emitter driver 260 operates, the laser emitter 240 moves back and forth in a direction perpendicular to the rotation center axis A of the rotary base 220 to selectively irradiate laser beams onto a plurality of points on the reflective surface 232 of the reflector 230.

The laser receiver 250 is disposed on the fixed base 210, and thus a position of the laser receiver 250 is fixed. Also, the laser receiver 250 is disposed under the reflector 230 that rotates. The laser receiver 250 senses reflected laser beams emitted from the laser emitter 240 to the outside that are reflected from surrounding topography or geographical features. The laser receiver 250 includes an optical lens 252 enabling condensing and a photosensitive sensor 254 having high sensitivity so as to sense a weak reflected laser beam.

The slip ring 270 transmits power and an electrical signal between a rotary body and a fixed body and includes a fixed part 274 that is combined with the fixed base 210 and a rotary part 272 that relatively rotates in a rotation direction with respect to the fixed part 274. A cable 262 is connected to a terminal of the rotary part 272 of the slip ring 270, i.e., rotation terminal, and is connected to the laser emitter driver 260 and the laser emitter 240 (or a laser generator that generates a laser beam and transmits the laser beam to the laser emitter 240). In other words, the rotary part 272 of the slip ring 270 rotates with a rotation of the rotary base 220 to supply power and control signals to the laser emitter driver 260 and the laser emitter 240 (or the laser generator).

The rotation driver 280 forcibly rotates the rotary base 220, is disposed on the fixed base 210, and forcibly rotates a gear 282 that is combined with an inside of the rotary base 220. Therefore, as the rotation driver 280 operates, the rotary base 220, the reflector 230 disposed under the rotary base 220, the laser emitter 240, and the laser emitter driver 260 rotate together.

The controller 290 controls operations of parts that are electrically connected to the laser emitter 240, the laser emitter driver 260, the laser receiver 250, and the rotation driver 280. The controller 290 may include a microprocessor and extract information about surrounding topography or geographical features by using a signal acquired by the laser receiver 250. The controller 290 may communicate with a control center positioned outside the panoramic scan radar 10 of the present exemplary embodiment, for example, a control center positioned in a controller of a car or in a remote place.

An operation of the panoramic scan radar 10 according to the present exemplary embodiment will now be described.

Figure 5:
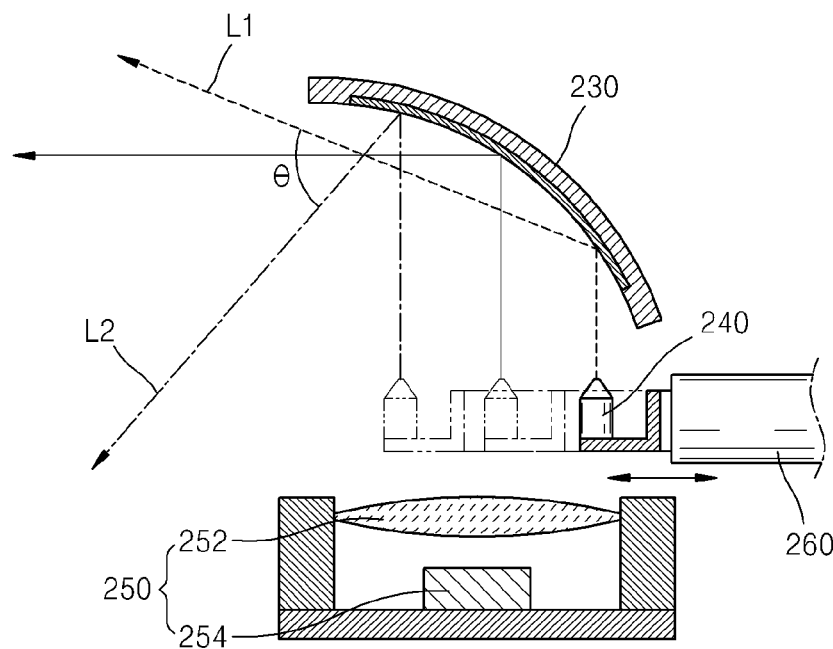
FIG. 5 is a schematic view illustrating laser beams reflecting from the panoramic scan radar of FIG. 2.
Figure 6:
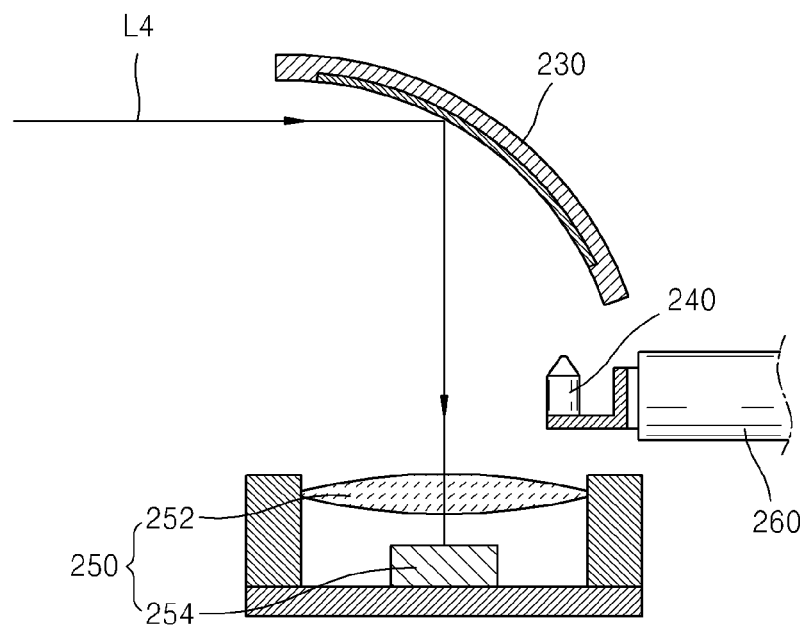
FIG. 6 is a schematic view illustrating the panoramic scan radar of FIG. 2 that receives a reflected laser beam.

FIGS. 5 and 6 are schematic cross-sectional views illustrating a part of the laser transceiver module 200 of the panoramic scan radar 10 of the present exemplary embodiment, i.e., respectively illustrate an emission and a reception of a laser beam.

As shown in FIG. 5, the laser emitter 240 moves back and forth in the direction perpendicular to the rotation center axis A of the rotary base 220 by the laser emitter driver 260 to irradiate laser beams L1 and L2. The laser beams L1 and L2 emitted from the laser emitter 240 are reflected on the reflector 230 to be emitted outside the panoramic scan radar 10 through the light-transmitting window 110 of the case 100.

Here, the reflective surface 232 of the reflector 230 is bent in a concave minor shape in one direction. Therefore, irradiation directions of a laser beam when the laser emitter 240 is close to the laser emitter driver 260 is not parallel to irradiation directions of a laser beam when the laser emitter 240 is distance from the laser emitter driver 260. However, the irradiation directions intersect with each other at a predetermined angle θ. In other words, irradiation direction of a laser beam emitted to the outside are periodically changed in up and down directions according to a position movement of the laser emitter 240.

Referring to FIG. 6, an emitted laser beam is reflected from external topography or geographical features and returns to the panoramic scan radar 10. The returned laser beam L4 is reflected onto the reflector 230 and then incident onto the laser receiver 250. The laser receiver 250 senses the reflected laser beam L4 and transmits a signal of the reflected laser beam L4 to the controller 290. The controller 290 calculates a distance from an external object that has reflected the laser beam by using a time difference, a phase difference, interference, or the like between the laser beams L1 and L2 emitted from the laser emitter 240 and the reflected laser beam L4 sensed by the laser receiver 250.

When the rotary base 220 rotates, the laser emitter 240 moves back and forth to irradiate a laser beam and senses a reflected laser beam. Therefore, the panoramic scan radar 10 of the present exemplary embodiment simultaneously performs laser scanning in the rotation direction and in up and down directions to stereoscopically acquire information the surrounding topography or geographical features.

In the panoramic scan radar 10 of the present exemplary embodiment, only the laser emitter 240 and the laser emitter driver 260 are combined with the rotary base 220 to rotate together. Therefore, the slip ring 270 includes only a rotary terminal (not shown) that is connected to the laser emitter 240 and the laser emitter driver 260. As a result, the number of necessary terminals of the slip ring 270 may be minimized. If the number of rotary terminals increases, it is difficult to manufacture a slip ring, and thus the cost of the slip ring is considerably increased. However, in the panoramic scan radar 10 of the present exemplary embodiment, the number of rotary terminals of the slip ring 270 may be minimized, and thus manufacturing costs may be effectively reduced.

After a general slip ring has rotated over one million to one hundred million times, the general slip ring is discarded. Therefore, to overcome this, a slip ring having a semi-permanent life is used. However, the number of terminals of a slip ring having a semi-permanent life, such as a mercury slip ring, is limited. The panoramic scan radar 10 of the present exemplary embodiment has an advantage of reducing the number of rotary terminals such that a mercury slip ring may be easily and semi-permanently used.

In the panoramic scan radar 10 of the present exemplary embodiment, the reflector 230 is fixedly installed at the rotary base 220, and thus an influence of an external shock or vibrations of a car on the reflector 230 may be effectively reduced. In particular, if an angle of the reflector 230 is tilted due to an external shock or vibrations, an irradiation direction of a laser beam may be seriously changed. However, the panoramic scan radar 10 of the present exemplary embodiment, the reflector 230 is stably fixedly combined with the rotary base 220, and thus an angle of a laser beam may be effectively prevented from being tilted.

A panoramic scan radar according to another exemplary embodiment will now be described with reference to the drawings.

Like the panoramic scan radar 10 of FIG. 2, the panoramic scan radar according to the present exemplary embodiment includes a case (not shown) and a laser transceiver module that is disposed inside the case. A shape of the case of the panoramic scan radar of the present exemplary embodiment is the same as that of the case 100 of the panoramic scan radar 10 of FIG. 2. Therefore, a repeated description thereof is omitted, and a difference between the laser transceiver module of the case of the present exemplary embodiment and the laser transceiver module 200 of the case 100 will be mainly described.

Figure 7:
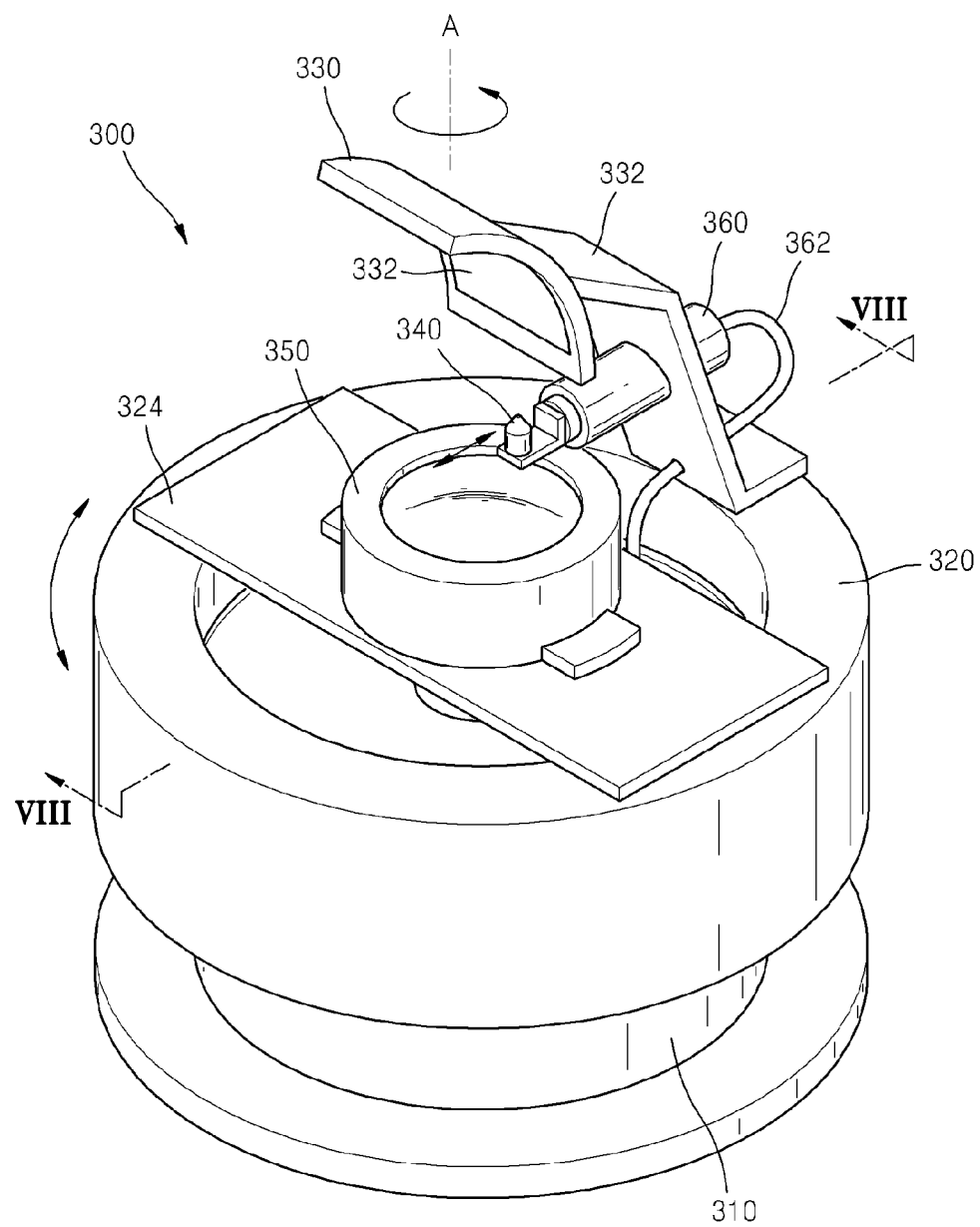
FIG. 7 is a schematic perspective view illustrating a laser transceiver module of a panoramic scan radar according to another exemplary embodiment.
Figure 8:
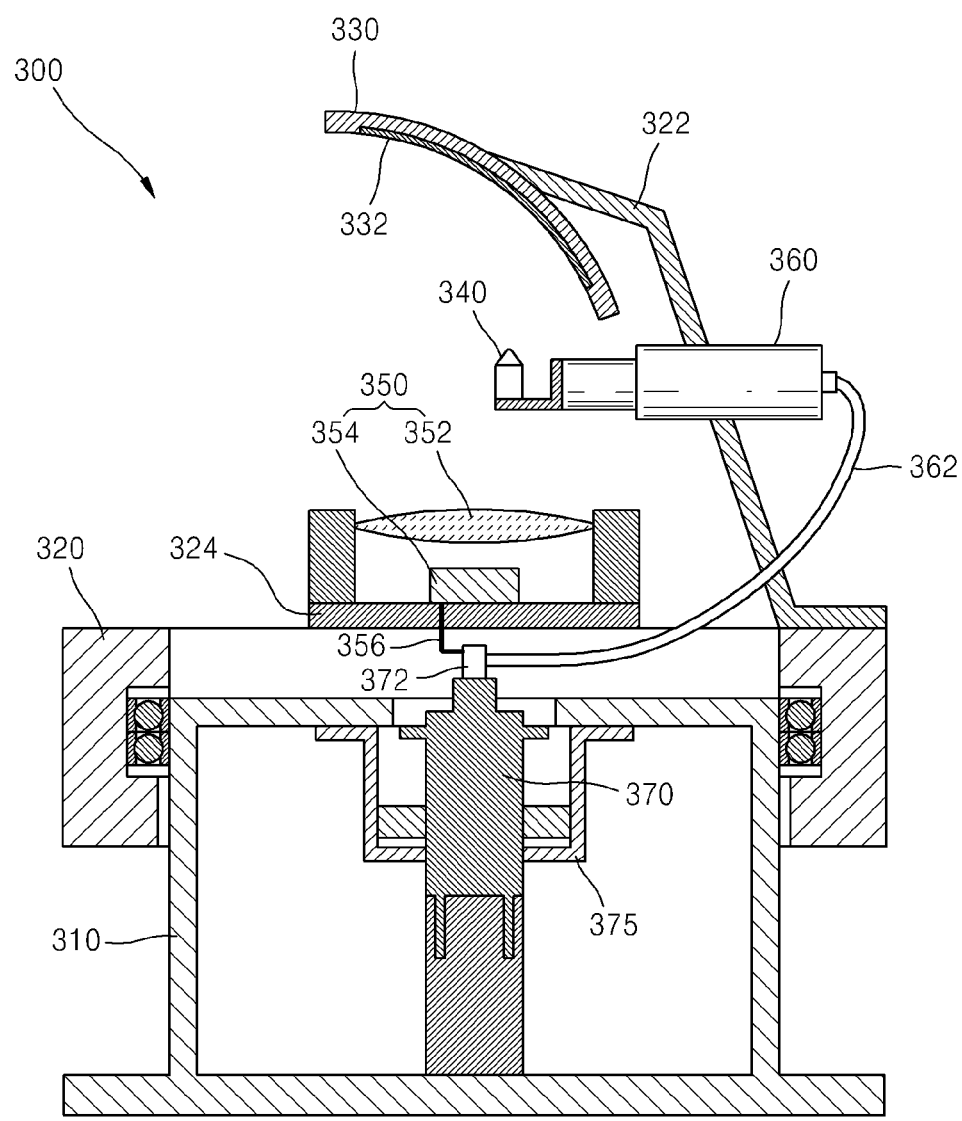
FIG. 8 is a schematic cross-sectional view taken along line VIII-VIII of FIG. 7.

FIG. 7 is a schematic perspective view of a laser transceiver module 300 of a panoramic scan radar according to another exemplary embodiment. FIG. 8 is a schematic cross-sectional view of the laser transceiver module 300 taken along line VIII-VIII of FIG. 7.

Referring to FIGS. 7 and 8, the laser transceiver module 300 of the panoramic scan radar of the present exemplary embodiment includes a fixed base 310, a rotary base 320, a reflector 330, a laser emitter 340, a laser emitter driver 360, a laser receiver 250, a slip ring 370, a rotation driver (not shown), and a controller (not shown).

The fixed base 310, the rotary base 320, the reflector 330, the laser emitter 340, the laser emitter driver 360, the rotation driver, and the controller of the laser transceiver module 300 of the panoramic scan radar of the present exemplary embodiment are the same as those of the laser transceiver module 200 of FIG. 3. In other words, the rotary base 320 receives rotation power from the rotation driver and thus rotates on the fixed base 310, and the reflector 330 is fixed onto the rotary base 320 by a reflector support part 322 to rotate with the rotary base 320. The laser emitter driver 360 is disposed on the rotary base 320 to rotate with the rotary base 320, and the laser emitter 340 is disposed on a side of the laser emitter driver 360. Therefore, the laser emitter 340 moves back and forth according to an operation of the laser emitter driver 360 to irradiate a laser beam onto a reflective surface 332 of the reflector 330.

The laser receiver 350 is disposed on a support plate 324 combined with the rotary base 320 to rotate with a rotation of the rotary base 320. The laser receiver 350 receives a laser beam reflected from a surrounding object and includes an optical system and a photosensitive sensor 354. The photosensitive sensor 354 of the laser receiver 350 is electrically connected to a rotary terminal 372 of the slip ring 370.

The slip ring 370 is disposed under the laser receiver 350 and is fixedly combined with the fixed base 310 by a slip ring support 375. The slip ring 370 includes the rotary terminal 372 that is capable of rotating and transmits power and signals. The rotary terminal 372 is connected to a cable 356 that is connected to the laser receiver 350, and to a cable 362 that is connected to the laser emitter driver 360. Therefore, the laser receiver 350, the laser emitter driver 360, and the laser emitter 340 rotate with the rotary base 320 and are supplied with power through the slip ring 370 to transmit and/or receive a control signal.

The laser transceiver module 300 of the panoramic scan radar of the present exemplary embodiment rotates with the rotary base 320, and simultaneously, the laser emitter 340 moves back and forth as controlled by the laser emitter driver 360. Therefore, a laser beam performs laser scanning in the rotation direction and simultaneously performs laser scanning in up and down directions.

Also, since the reflector 330 is fixedly combined with the rotary base 320, a position of the reflector 330 may be stably kept even when an external shock is applied or when a car, on which the laser transceiver module 300 is mounted, vibrates.

A panoramic scan radar according to another exemplary embodiment will now be described with reference to the drawings.

Like the panoramic scan radar 10 of FIG. 2, the panoramic scan radar of the present exemplary embodiment includes a case (not shown) and a laser transceiver module that is disposed inside the case. A shape of the case of the panoramic scan radar of the present exemplary embodiment is the same as that of the case 100 of the panoramic scan radar 10 of FIG. 2, and thus a repeated description thereof is omitted. Also, a difference between the laser transceiver module of the case of the present exemplary embodiment and the laser transceiver module 200 of the case 100 will be mainly described.

Figure 9:
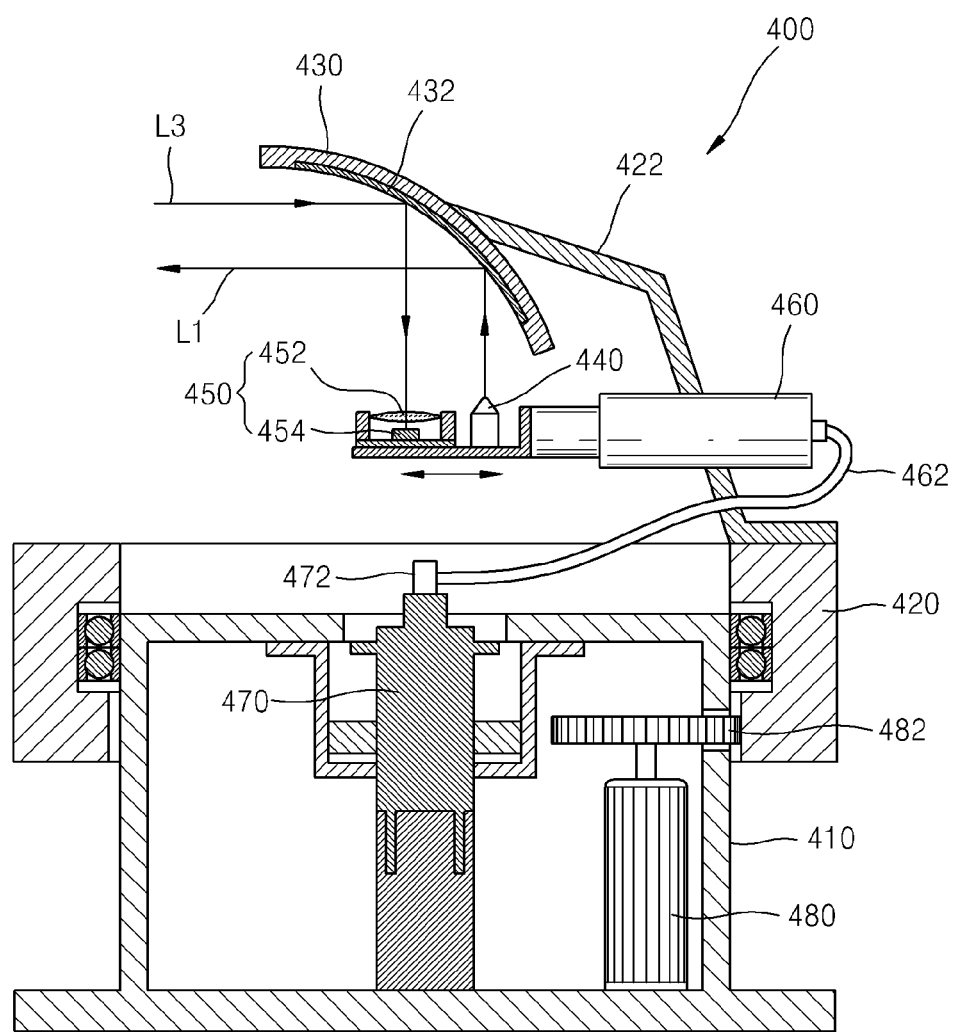
FIG. 9 is a schematic cross-sectional view illustrating a laser transceiver module of a panoramic scan radar according to another exemplary embodiment.

FIG. 9 is a schematic cross-sectional view illustrating a laser transceiver module 400 of a panoramic scan radar according to another exemplary embodiment.

Referring to FIG. 9, the laser transceiver module 400 of the panoramic scan radar of the present exemplary embodiment includes a fixed base 410, a rotary base 420, a reflector 430, a laser emitter 440, a laser emitter driver 460, a laser receiver 450, a slip ring 470, a rotation driver 480, and a controller (not shown).

The fixed base 410, the rotary base 420, the reflector 430, the laser emitter 440, the laser emitter driver 460, the rotation driver 480, and the controller of the laser transceiver module 400 of the panoramic scan radar of the present exemplary embodiment are the same as those of the laser transceiver module 200 of FIG. 3. In other words, the rotary base 420 is rotatably combined with the fixed base 410, and the reflector 430 is fixed onto the rotary base 420 by a reflector support 422 to rotate with the rotary base 420. The laser emitter driver 460 is disposed on the rotary base 420 to rotate with the rotary base 420, and the laser emitter 440 is disposed on a side of the laser emitter driver 460. Therefore, the laser emitter 440 moves back and forth according to an operation of the laser emitter driver 460 to irradiate a laser beam onto a reflective surface 432 of the reflector 430. The rotation driver 480 is combined with the rotary base 420 through a gear 482 to rotate the rotary base 420.

The laser receiver 450 includes an optical system 452 and a photosensitive sensor 454 and is combined with the laser emitter driver 460 to linearly move back and forth along with the laser emitter 440. Therefore, a laser beam irradiated from the laser emitter 440 is reflected from the reflective surface 432 of the reflector 430 to be emitted to the outside. Also, the emitted laser beam is reflected from an object, returns onto the reflector 430 to be reflected toward the laser receiver 450, and is then sensed by the laser receiver 450.

The slip ring 470 includes a rotary terminal 472, and the rotary terminal 472 is connected to a cable 462 that is connected to the laser emitter 440, the laser receiver 450, and the laser emitter driver 460. Therefore, power and a control signal are transmitted to the laser emitter 440, the laser receiver 450, and the laser emitter driver 460 that rotate with the rotary base 420.

The reflector 430 of the present exemplary embodiment is also fixed to a support 422 fixed to the rotary base 420, so that a position of the reflector 430 is stably kept even when an external shock is applied or when a car, on which the laser transceiver module 400 is mounted, vibrates.

A panoramic scan radar according to another exemplary embodiment will now be described.

Like the panoramic scan radar 10 of FIG. 2, a panoramic scan radar of the present exemplary embodiment includes a case (not shown) and a laser transceiver module that is disposed inside the case. A shape of the case of the panoramic scan radar of the present exemplary embodiment is the same as that of the case 100 of the panoramic scan radar 10 of FIG. 2, and thus a repeated description thereof is omitted. Also, a difference between the laser transceiver module of the case of the present exemplary embodiment and the transceiver module 200 of the case 100 of FIG. 2 will be mainly described.

Figure 10:
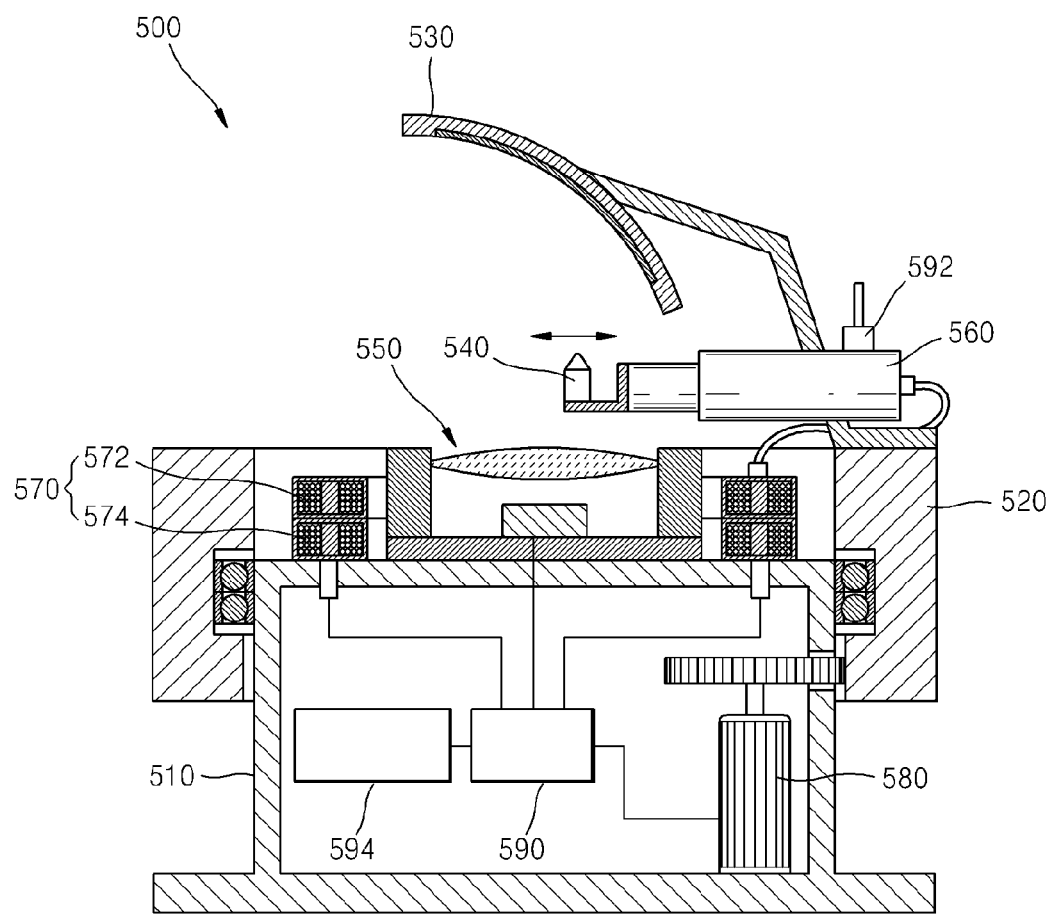
FIG. 10 is a schematic cross-sectional view illustrating a laser transceiver module of a panoramic scan radar according to another exemplary embodiment.

FIG. 10 is a schematic cross-sectional view of a laser transceiver module 500 of a panoramic scan radar according to another exemplary embodiment.

Referring to FIG. 10, the laser transceiver module 500 of the panoramic scan radar of the present exemplary embodiment includes a fixed base 510, a rotary base 520, a reflector 530, a laser emitter 540, a laser emitter driver 560, a laser receiver 550, a rotary transformer 570, a rotation driver 580, a controller 590, a first wireless communicator 592, and a second wireless communicator 594.

The fixed base 510, the rotary base 520, the reflector 530, the laser emitter 540, the laser emitter driver 560, the laser receiver 550, the rotation driver 580, and the controller 590 are the same as those of the laser transceiver module 200 of FIG. 4, and thus their repeated descriptions are omitted.

The laser transceiver module 500 of the present exemplary embodiment includes the rotary transformer 570 instead of a slip ring. The rotary transformer 570 includes a first coil side 574 and a second coil side 572 that are relatively rotatable with respect to each other. The first coil side 574 of the rotary transformer 570 is combined with the fixed base 510, and the second coil side 572 is combined with the rotary base 520 to rotate with the rotary base 520. Each of the first and second coil sides 574 and 572 of the rotary transformer 570 includes a core and a coil that is wound around the core. If an alternating current is applied to the coil of the first coil side 574, and thus a magnetic field is formed, a current is induced to the coil of the second coil side 572 by the magnetic field. Therefore, the rotary transformer 570 receives power from an external source and transmits the power to the rotary base 520 according to a non-contact method.

The rotary transformer 570 is able to transmit power but is not effective at transmitting an electrical signal such as a control signal. Therefore, the laser transceiver module 500 of the present exemplary embodiment includes the first and second wireless communicators 592 and 594 to transmit the electrical signal such as the control signal according to a non-contact method. The first wireless communicator 592 is combined with the rotary base 520 to rotate with the rotary base 520, and the second wireless communicator 594 is combined with the fixed base 510 and wirelessly transmits and/or receives a signal with the first wireless communicator 592. In other words, the controller 590 wirelessly communicates with the first wireless communicator 592 through the second wireless communicator 594, and transmits to and/or receives the control signal from the laser emitter 540 and the laser emitter driver 560 disposed on the rotary base 520.

Therefore, the laser transceiver module 500 of the present exemplary embodiment may transmit and/or receive power and signals by using the rotary transformer 570, the first wireless communicator 592, and the second wireless communicator 594 according to a non-contact method. As a result, a high-priced slip ring is not needed to transmit power and signals to the laser emitter 540, the laser emitter driver 560, etc. disposed on the rotary base 520, and the laser transceiver module 500 may be manufactured in a simple structure.

A panoramic scan radar according to another exemplary embodiment will now be described.

Like the panoramic scan radar 10 of FIG. 2, the panoramic scan radar of the present exemplary embodiment includes a case (not shown) and a laser transceiver module that is disposed inside the case. A shape of the case of the panoramic scan radar of the present exemplary embodiment is the same as that of the case 100 of the panoramic scan radar 10 of FIG. 2, and thus a repeated description thereof is omitted. Also, a difference between the laser transceiver module of the case of the present exemplary embodiment and the laser transceiver module 200 of the case 100 of FIG. 2 will be mainly described.

Figure 11:
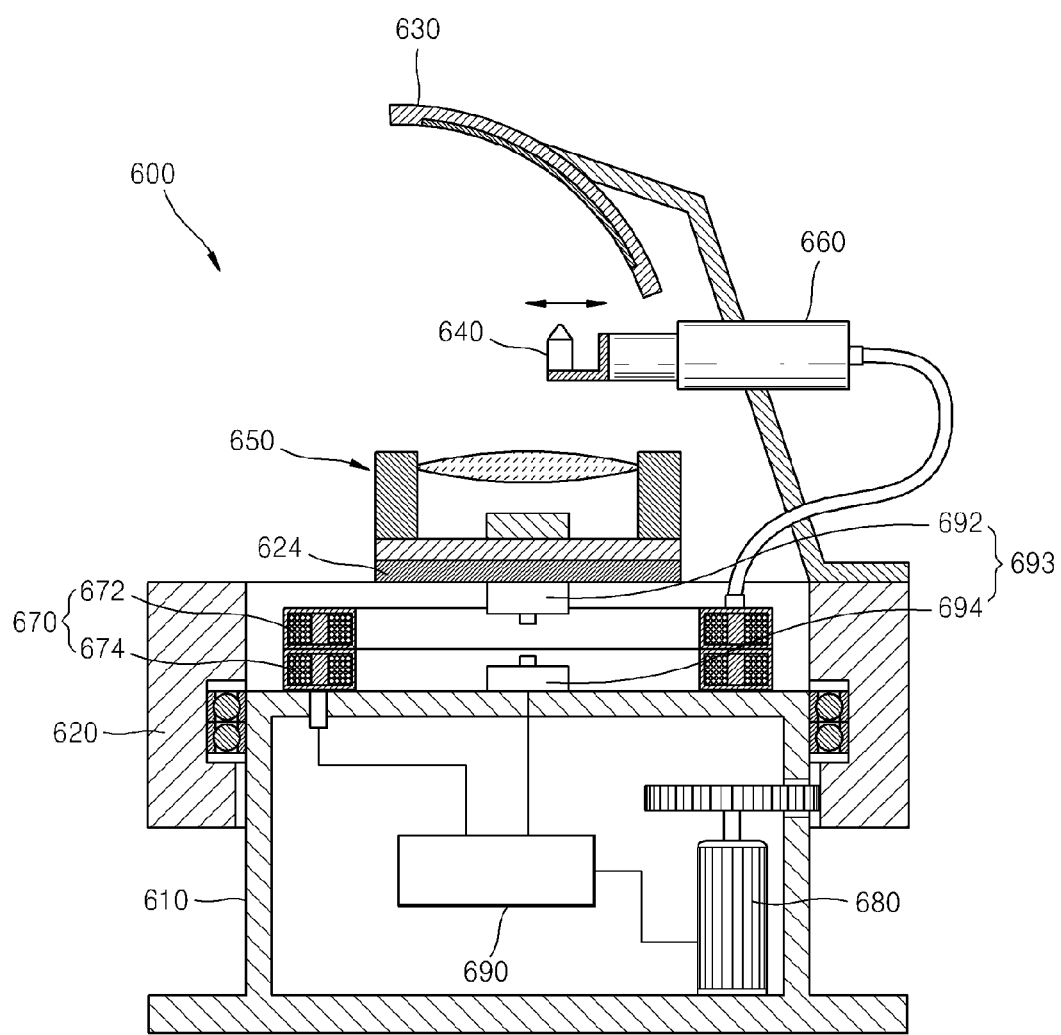
FIG. 11 is a schematic cross-sectional view illustrating a laser transceiver module of a panoramic scan radar according to another exemplary embodiment.

FIG. 11 is a schematic cross-sectional view of a laser transceiver module 600 of a panoramic scan radar according to another exemplary embodiment.

Referring to FIG. 11, the laser transceiver module 600 of the panoramic scan radar of the present exemplary embodiment includes a fixed base 610, a rotary base 620, a reflector 630, a laser emitter 640, a laser emitter driver 660, a laser receiver 650, a rotary transformer 670, a rotation driver 680, a controller 690, and a light signal transceiver 693.

The fixed base 610, the rotary base 620, the reflector 630, the laser emitter 640, the laser emitter driver 660, and the laser receiver 650 of the present exemplary embodiment are the same as those of the laser transceiver module 300 of the panoramic scan radar of FIG. 7. In other words, the laser receiver 650 of the present exemplary embodiment is disposed on a support plate 624 disposed on the rotary base 620 to rotate with the rotary base 620.

The rotation driver 680 operates according to a control command of the controller 690 to control a rotation of the rotary base 620.

The controller 690 controls the fixed base 610, the rotary base 620, the reflector 630, the laser emitter 640, the laser emitter driver 660, the laser receiver 650, the rotary transformer 670, the rotation driver 680, and the optical signal transceiver 693 of the laser transceiver module 600. The controller 690 may include a microprocessor.

A first coil side 674 of the rotary transformer 670 is combined with the fixed base 610, and a second coil side 672 of the rotary transformer 670 is combined with the rotary base 620 to transmit power from the fixed base 610 to the rotary base 620 according to a non-contact method.

The light signal transceiver 693 transmits and/or receives a signal in a light form and includes a transmitter 692 combined with the rotary base 620 and a receiver 694 combined with the fixed base 610. The transmitter 692 converts an electrical signal into a light signal and transmits the light signal, and the receiver 694 receives the light signal and converts it into an electrical signal. Therefore, the light signal receiver 693 may transmit a signal in a non-contact method. The receiver 694 converts the received light signal into the electrical signal and transmits the electrical signal to the controller 690.

Positions of the transmitter 692 and the receiver 694 of the light signal transceiver 693 may be opposite each other. In other words, the transmitter 692 may be disposed on the rotary base 620, and the receiver 694 may be disposed on the fixed base 610. The light signal transceiver 693 may also be constituted so that light transmission modules are respectively disposed on the fixed base 610 and the rotary base 620 to enable bidirectional optical communications.

As described above, the panoramic scan radar including the laser transceiver module 600 according to the present exemplary embodiment transmits power and signals in a non-contact method. Therefore, even when the rotary base 620 rotates, the power and the signals may be transmitted without any problems. Therefore, an additional slip ring is not needed.

Exemplary embodiments have been described, but exemplary embodiments may be embodied in other forms.

For example, in the above-described exemplary embodiments, the laser emitters 240, 340, and 440 perform position movements linearly with respect to the laser emitter drivers 260, 360, and 460. However, positions of the laser emitters 240, 340, and 440 may be fixed, and only irradiation directions of the laser emitters 240, 340, and 440 may be periodically tilted.

Figure 12:
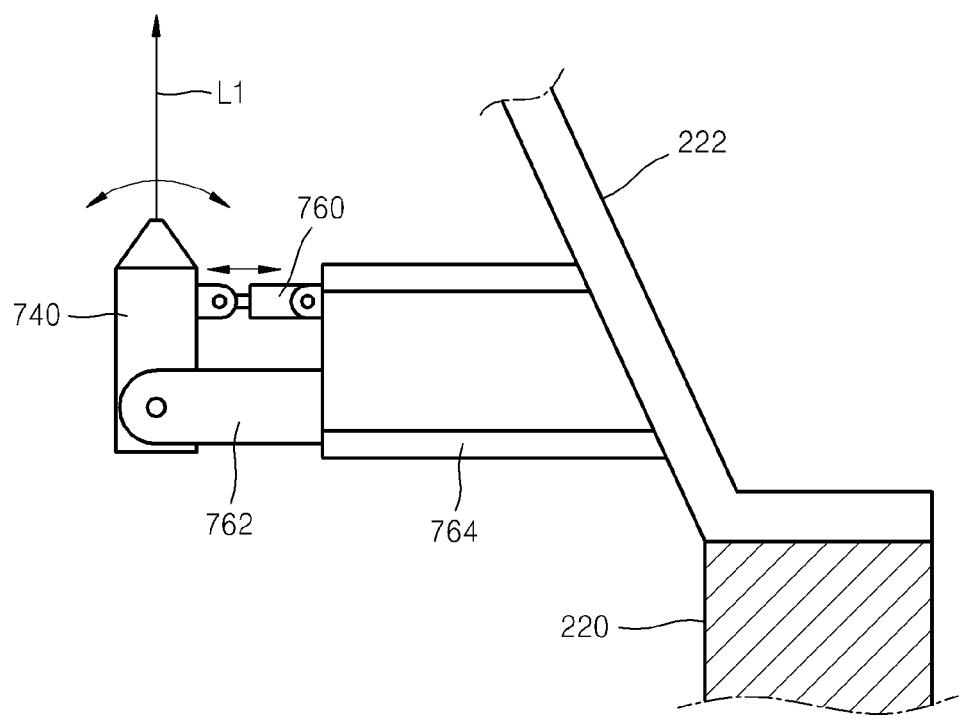
FIG. 12 is a schematic view illustrating a modification of a laser emitter of a panoramic scan radar according to an exemplary embodiment.

FIG. 12 is a schematic view illustrating of a modification of the laser emitter 240 of the panoramic scan radar 10 of FIG. 2. Referring to FIG. 12, the laser emitter 740 is hinged on a hinge support 762 to be tilted to the left and right. The hinge support 762 is fixed to a reflector support 222 by a support frame 764, and the reflector support 222 is fixed to the rotary base 220 as described above. The laser emitter driver 760 repeatedly pushes and pulls a side of the laser emitter 740 to periodically tilt the laser emitter 240. Therefore, a laser irradiation direction of the laser emitter 740 is periodically changed, and a laser beam which is reflected from the reflective surface 232 having a curved surface scans surroundings in up and down directions.

In the above-described exemplary embodiments, the reflective surfaces 232, 332, and 432 of the reflectors 230, 330, and 430 have concave mirror shapes but may have convex mirror shapes. Even if the reflective surfaces 232, 332, and 432 of the reflector 230, 330, and 430 are formed as having the convex minor shapes, and the laser emitters 240, 340, and 440 linearly move to irradiate laser beams onto the reflective surfaces 232, 332, and 432, up and down angles of laser beams reflected from the reflective surfaces 232, 332, and 432 may be changed.

The reflective surfaces 232, 332, and 432 of the reflectors 230, 330, and 430 may have plane mirror shapes. However, although the reflective surfaces 232, 332, and 432 of the reflectors 230, 330, and 430 may have the plane minor shapes, and the laser emitters 240, 340, and 440 linearly move back and forth, vertical angles of laser beams may not be changed. Therefore, if the reflectors 230, 330, and 430 are formed as having plane shapes, a laser irradiation angle of the laser emitter 240 may be changed so that vertical angles of a laser beam reflected from the reflector 340 to the outside may be changed in up and down direction.

Also, in the above-described exemplary embodiments, the rotation drivers 280, 380, and 480 for rotating the rotary bases 220, 320, and 420 are combined with insides of the rotary bases 220, 320, and 420 through gears. However, the rotation drivers 280, 380, and 480 may be combined with the rotary bases 220, 320, and 420 through belts or chains to transmit rotation powers to the rotary bases 220, 320, and 420. Alternatively, the rotation drivers 280, 380, and 480 may be combined with outsides of the rotary bases 220, 320, and 420.

In a panoramic scan radar and a panoramic laser scanning method according to exemplary embodiments, a mechanical apparatus is simplified. Also, the panoramic scan radar stably operates even when a car, on which the panoramic scan radar is mounted, vibrates, and the number of terminals of a slip ring is minimized.

While exemplary embodiments have been particularly shown and described with reference to exemplary embodiments thereof, it will be understood by those of ordinary skill in the art that various changes in form and details may be made therein without departing from the spirit and scope the inventive concept, as defined by the appended claims.

What is claimed is:

1. A panoramic scan radar comprising:
   a fixed base;
   a rotary base which is rotatably combined with the fixed base;
   a reflector which is disposed on the rotary base to rotate with the rotary base and comprises a reflective surface;
   a laser emitter which is disposed on the rotary base to rotate with the rotary base and configured to selectively irradiate laser beams onto a plurality of points on the reflective surface of the reflector; and
   a laser receiver,
   wherein the reflector is configured to reflect the laser beams toward an object and reflect at least one of the laser beams reflected by the object toward the laser receiver, and
   wherein the laser receiver is configured to sense the at least one of the laser beams reflected toward the laser receiver.

2. The panoramic scan radar of claim 1, wherein the reflective surface of the reflector is formed as a curved surface.

3. The panoramic scan radar of claim 2, wherein the laser emitter is disposed in a direction intersecting with a rotation center line of the reflector to linearly move back and forth and comprises a laser emitter driver configured to forcibly linearly move the laser emitter back and forth.

4. The panoramic scan radar of claim 3, wherein the laser receiver is disposed on the fixed base and comprises:
   a slip ring that is fixed on the fixed base; and
   a rotation terminal that is rotatably disposed on the fixed base,
   wherein the laser emitter driver is electrically connected to the rotation terminal of the slip ring.

5. The panoramic scan radar of claim 3, wherein the laser receiver is configured to linearly move back and forth with the laser emitter in a direction intersecting with the rotation center line of the reflector.

6. The panoramic scan radar of claim 1, wherein the laser emitter is configured to periodically change irradiation angles of laser beams to selectively irradiate laser beams onto the plurality of points on the reflective surface of the reflector.

7. The panoramic scan radar of claim 1, wherein a rotary transformer is disposed between the fixed base and the rotary base and configured to wirelessly transmit power.

8. The panoramic scan radar of claim 1, further comprising:
   a first wireless communicator which is disposed on the rotary base to rotate with the rotary base; and
   a second wireless communicator which is disposed on the fixed base and configured to wirelessly transmit a signal to or receive a signal from the first wireless communicator.

9. The panoramic scan radar of claim 1, further comprising:
   a light transmitter which is disposed on one of the rotary base and the fixed base; and
   a light receiver which is disposed on the other one of the rotary base and the fixed base,
   wherein the light receiver is configured to receive a light signal from the light transmitter and convert the light signal into an electrical signal.

10. The panoramic scan radar of claim 1, further comprising:

a rotary transformer which is disposed between the fixed base and the rotary base and configured to transmit power according to a non-contact method;

a first wireless communicator which is disposed on the rotary based to rotate with the rotary base; and a second wireless communicator which is disposed on the fixed base and configured to wirelessly transmit a signal to or receive a signal from the first wireless communicator.

11. The panoramic scan radar of claim 1, further comprising:

a rotary transformer which is disposed between the fixed base and the rotary base and configured to transmit power according to a non-contact method;

a light transmitter which is disposed on one of the rotary base and the fixed base; and a light receiver which is disposed on the other one of the rotary base and the fixed base, wherein the light receiver is configured to receive a light signal from the light transmitter, and convert the light signal into an electrical signal.

12. A panoramic laser scanning method comprising:

rotating a reflective surface and a laser emitter together;

selectively irradiating a laser beam from the laser emitter onto a plurality of points on the reflective surface;

reflecting the laser beam from the reflective surface to emit the laser beam away from the laser emitter;

receiving the emitted laser beam reflected from an object toward the reflective surface; and sensing the received laser beam.

13. The panoramic laser scanning method of claim 12, wherein the reflective surface is formed as a curved surface.

14. The panoramic laser scanning method of claim 13, wherein a laser emitter linearly moves back and forth when emitting the laser beam in order to irradiate the laser beam onto the plurality of points on the reflective surface.

15. The panoramic laser scanning method of claim 14, wherein the returning laser beam is sensed by a laser receiver that linearly moves back and forth together with the laser emitter.

16. The panoramic laser scanning method of claim 12, wherein the laser beam is emitted while changing an irradiation angle of the laser emitter in order to irradiate the laser beam onto the plurality of points on the reflective surface.

17. The panoramic laser scanning method of claim 12, further comprising:

supplying power to the laser emitter according to a non-contact method by using a rotary transformer.

18. The panoramic laser scanning method of claim 12, further comprising:

transmitting a control signal of the laser emitter by using wireless communication.

19. The panoramic laser scanning method of claim 12, further comprising:

transmitting a control signal of the laser emitter according to a non-contact method by using light communication.

20. A panoramic scan radar apparatus comprising:

a fixed base;

a rotary base rotatably connected to the fixed base and configured to rotate around a vertical axis;

a reflector disposed on the rotary base and including a reflective surface; and a laser emitter disposed on the rotary base and configured to move in a perpendicular direction with respect to the vertical axis and emit a laser beam in a vertical direction toward the reflective surface.

21. The panoramic scan radar of claim 20, further comprising a laser receiver, wherein the reflector is configured to reflect the laser beam away from the laser receiver toward a second reflector, wherein the reflector is configured to reflect the laser beam reflected by the second reflector toward the laser receiver, and wherein the laser receiver is configured to sense the laser beam reflected toward the laser receiver.

22. The panoramic scan radar of claim 21, wherein the reflective surface of the reflector is formed as a curved surface.

* * * * *